(12) United States Patent
Tamai

(10) Patent No.: US 7,559,387 B2
(45) Date of Patent: Jul. 14, 2009

(54) DECELERATION RATE BASED ENGINE SPIN CONTROL AND ENGINE OFF FUNCTIONALITY

(75) Inventor: Goro Tamai, West Bloomfield, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 572 days.

(21) Appl. No.: 11/017,173

(22) Filed: Dec. 20, 2004

(65) Prior Publication Data
US 2006/0131085 A1 Jun. 22, 2006

(51) Int. Cl.
*B60K 1/00* (2006.01)
(52) U.S. Cl. ........... 180/65.2; 180/65.21; 180/65.275
(58) Field of Classification Search ....... 180/65.1–65.8, 180/170; 290/40 A; 701/84, 86; 903/940–942, 903/946, 948
See application file for complete search history.

(56) References Cited

U.S. PATENT DOCUMENTS

| 6,018,198 | A  | * | 1/2000  | Tsuzuki et al. ............... 290/17 |
| 6,161,640 | A  | * | 12/2000 | Yamaguchi ................. 180/65.8 |
| 6,335,573 | B1 | * | 1/2002  | Eguchi et al. ............. 290/40 C |
| 2002/0056440 | A1 | * | 5/2002 | Nagata et al. ............... 123/436 |
| 2002/0059019 | A1 | * | 5/2002 | Nakao et al. .................. 701/22 |
| 2002/0093202 | A1 | * | 7/2002 | Downs et al. ............. 290/40 R |
| 2002/0094908 | A1 | * | 7/2002 | Urasawa et al. ................ 477/3 |
| 2002/0103055 | A1 | * | 8/2002 | Tani et al. .................... 477/115 |
| 2002/0134596 | A1 | * | 9/2002 | Morimoto et al. .......... 180/65.2 |
| 2002/0179047 | A1 | * | 12/2002 | Hoang et al. ................ 123/350 |
| 2003/0029653 | A1 | * | 2/2003 | Fujikawa .................... 180/65.2 |
| 2004/0134698 | A1 | * | 7/2004 | Yamamoto et al. ......... 180/65.2 |
| 2004/0148071 | A1 | * | 7/2004 | Itoh et al. ...................... 701/22 |
| 2005/0000481 | A1 | * | 1/2005 | Asakawa et al. ....... 123/179.16 |

* cited by examiner

Primary Examiner—Christopher P Ellis
Assistant Examiner—Katy Meyer (57) ABSTRACT

A hybrid vehicle that includes an engine and an electric machine that selectively drives the engine. A control module monitors a deceleration rate of the vehicle and regulates fueling of the engine based on the deceleration rate. The control module regulates rotation of a crankshaft of the engine based on the deceleration rate.

45 Claims, 5 Drawing Sheets

DECELERATION RATE BASED ENGINE SPIN CONTROL AND ENGINE OFF FUNCTIONALITY

FIELD OF THE INVENTION

The present invention relates to hybrid vehicles, and more particularly to a deceleration rate-based engine spin control (ESC) system of a hybrid vehicle.

BACKGROUND OF THE INVENTION

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

Traditionally, hybrid vehicles are controlled to cut-off fuel to the engine during deceleration while back-driving the engine. In this manner, fuel economy is improved. However, because engine fuel is cut-off upon vehicle deceleration, traditional control schemes fail to anticipate and adequately provide for other vehicle performance considerations including, but not limited to, battery charge and driver demanded performance.

SUMMARY OF THE INVENTION

Accordingly, the present invention provides a hybrid vehicle that includes an engine and an electric machine that selectively drives the engine. A control module monitors a deceleration rate of the vehicle and regulates fueling of the engine based on the deceleration rate. The control module regulates rotation of a crankshaft of the engine based on the deceleration rate.

In other features, the control module cuts-off fuel to the engine upon deceleration of the hybrid vehicle and inhibits rotation of the engine when a vehicle speed is equal to a stall speed. The electric motor drives the engine during deceleration to inhibit rotation of the crankshaft.

In other features, the control module cuts-off fuel to the engine upon deceleration of the hybrid vehicle and fuels the engine when a vehicle speed decelerates to a threshold vehicle speed. The control module cuts-off fuel to the engine and inhibits rotation of the engine when engine stop conditions are achieved. The engine stop conditions include the vehicle speed being equal to zero, a rotational speed of the crankshaft being less than a threshold speed and a manifold absolute pressure (MAP) of the engine being less than a threshold pressure.

In still another feature, the control module cuts-off fuel to the engine upon deceleration of the hybrid vehicle and fuels the engine when a vehicle speed decelerates to a stall speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
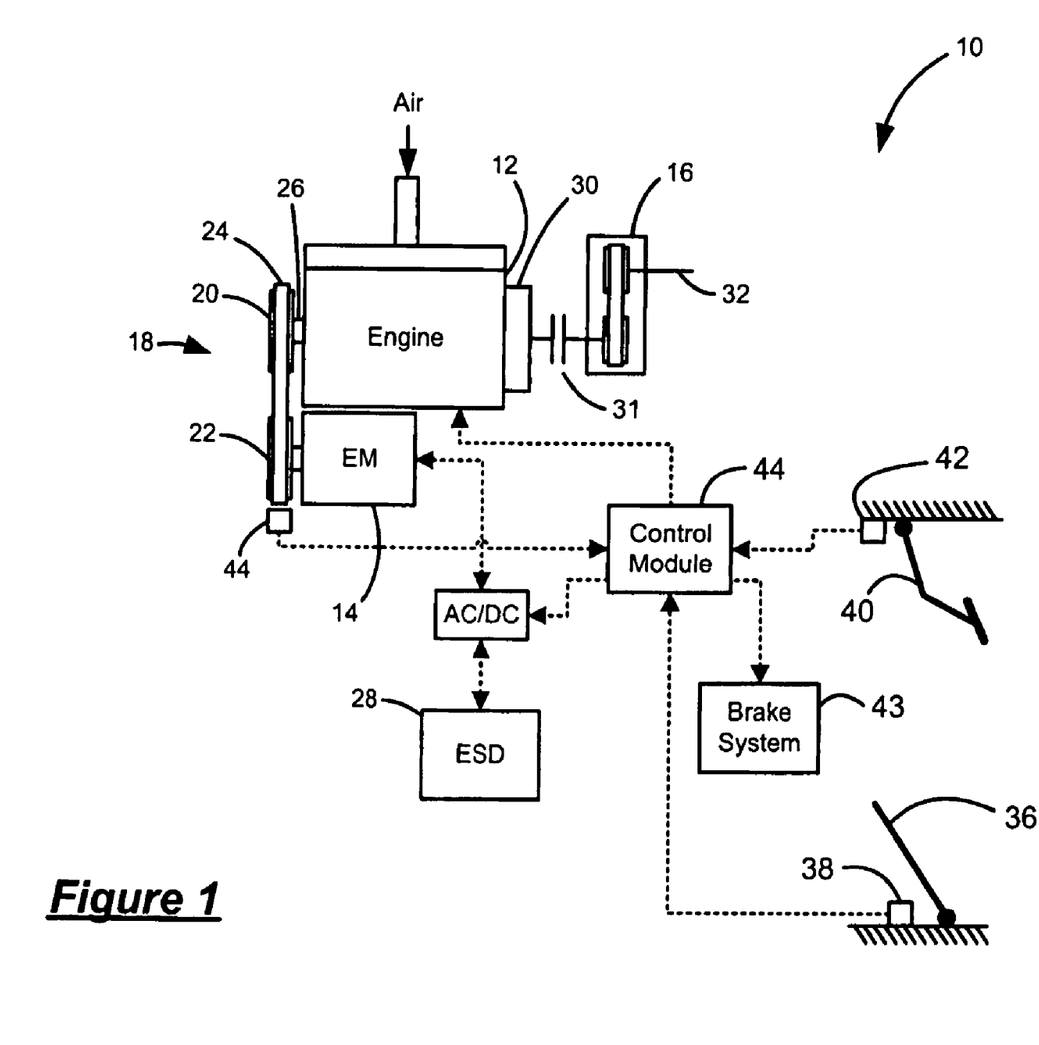
FIG. 1 is a schematic illustration of an exemplary hybrid vehicle that is operated based on an engine spin control system according to the present invention.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

Although the transmission is illustrated as a continuously variable transmission (CVT), the transmission 16 can include, but is not limited to, a CVT, a manual transmission, an automatic transmission and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. In the case of a CVT, the coupling device 30 is a torque converter including a torque converter clutch (TCC) 31. The transmission 16 multiplies the drive torque through one of a plurality of gear ratios to drive a driveshaft 32.

A control module 34 regulates operation of the vehicle 10 based on the engine spin control system of the present invention. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle, the engine cylinders do not fire and the valves can be deactivated. Drive torque is provided by the electric machine 14. When deactivated, fuel and spark are cut-off to the cylinders of the engine. Further, opening and closing cycles of the intake and exhaust valves can be prevented to inhibit air flow processing within the cylinders.

An accelerator pedal 36 is provided. A pedal position sensor 38 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown). A speed sensor 44 is responsive to the rotational speed ($RPM_{EM}$) of the electric machine 44. The speed sensor 44 generates a speed signal. The control module 34 operates the vehicle 10 based on the pedal position signals generated by the pedal position sensors 38,42 and the speed signal generated by the speed sensor 44, as described in further detail below. The engine speed ($RPM_{ENG}$) can be determined based on the speed signal. More specifically, $RPM_{EM}$ can be multiplied by the known pulley ratio to provide $RPM_{ENG}$.

The engine spin control system determines a deceleration mode based upon the manner in which vehicle deceleration occurs. The deceleration modes balance fuel economy and performance based on the driver input. The deceleration modes include, but are not limited to, a normal deceleration mode, an abrupt deceleration mode and a slow deceleration mode. The deceleration mode defines the point at which the engine is deactivated and the point at which the engine stops spinning. Although three deceleration modes are described herein it is anticipated that alternative deceleration modes can be implemented to handle other cases. The normal deceleration mode represents a majority of driving conditions and operates to maximize fuel economy. The abrupt deceleration mode represents periods of aggressive driving where it is probable that the driver may want to quickly accelerate after decelerating. The slow deceleration mode represents periods where the driver expects creep torque while modulating the brake pedal 40, such as is the case when maneuvering the vehicle in a parking lot.

Figure 2:
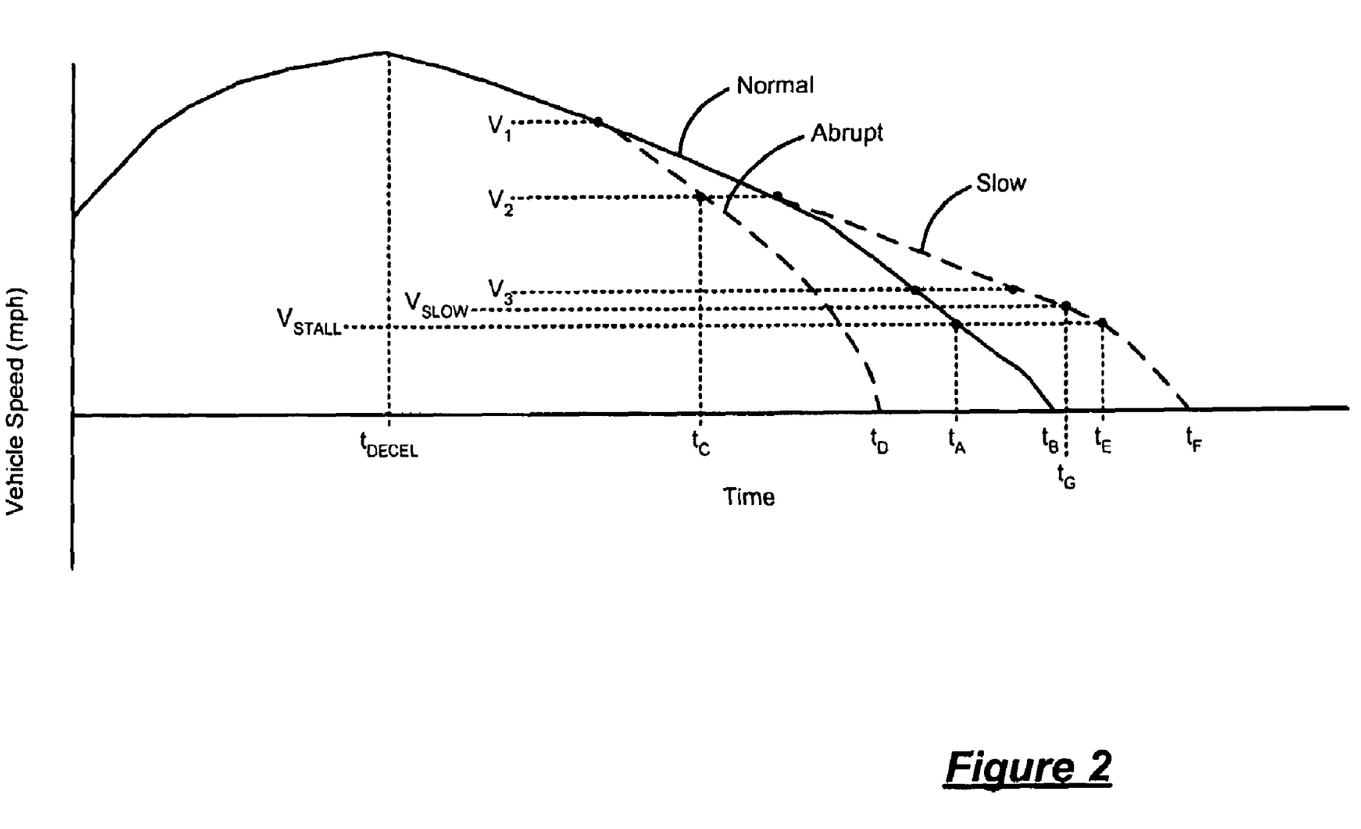
FIG. 2 is a graph illustrating vehicle speed for normal, abrupt and slow deceleration modes.

Exemplary vehicle speed curves are graphically illustrated in FIG. 2. The exemplary vehicle speed curves include a normal deceleration curve, an abrupt deceleration curve and a slow deceleration curve. The vehicle speed ($V_{VEH}$) increases until time $t_{DECEL}$, at which vehicle deceleration is initiated. Vehicle deceleration can be initiated by a driver relieving pressure from the accelerator pedal 36 and applying normal brake pressure to the brake pedal 40 (i.e., normal deceleration). Alternatively, vehicle deceleration can be initiated by the driver relieving pressure from the accelerator pedal 36 and applying aggressive brake pressure to the brake pedal 40 (i.e., abrupt deceleration). In still another alternative, vehicle deceleration can be initiated by the driver relieving pressure from the accelerator pedal 36 and gently applying brake pressure to the brake pedal 40 (i.e., slow deceleration). The abrupt deceleration curve deviates from the normal deceleration curve at $V_1$ and the slow deceleration curve deviates from the normal deceleration curve at $V_2$.

When decelerating in the normal deceleration mode, the engine 12 is back-driven with the fuel cut-off (i.e., no fuel to the cylinders) down to a low speed ($V_{STALL}$) (e.g., approximately 6 mph), which occurs at time $t_A$. Upon achieving $V_{STALL}$, the engine is stopped while the vehicle is rolls to a stop (i.e., $V_{VEH}$=0 mph) at time $t_B$. The electric machine 14 is used to maintain a monotonic deceleration feel during normal deceleration. In one case, the electric machine 14 is used to stitch together the negative torque from the deceleration fuel cut-off (DFCO) back-drive torque and the zero stopped-engine torque (i.e., zero torque resulting from the stopped engine). More specifically, as the engine 12 is back-driven to lower speeds, the engine back-drive braking torque becomes more noticeable. If the engine 12 were to be stopped during engine-braking, the driver would feel a sudden step decrease in vehicle braking for a given brake pedal pressure. To eliminate a step decrease in braking torque, torque generated by the electric machine 14 is transferred to the engine to provide a net zero crankshaft output torque, which matches the crankshaft torque when the engine 12 is stopped.

In an alternative case, the electric motor 14 stitches together the positive torque generated by the engine 12 when activated and the zero stopped-engine torque. For example, in the event that the vehicle speed at which the electric machine torque is delivered (e.g., approximately 7 mph) is extended beyond a threshold time (e.g. 3 seconds), fuel is redelivered to preserve the ESD 28. This can occur when the brake is applied while the vehicle is rolling down a hill and does not decelerate to $V_{STALL}$. Immediately prior to refueling the engine 12, the electric machine 14 is set to a speed-control mode and the engine 12 operates at a fueled-idle engine speed. When the engine 12 is refueled, the engine 12 provides positive creep torque. If the engine 12 were to be stalled during this creep, the driver would feel a sudden step increase in vehicle braking for a given brake pedal application force. To prevent the step increase in braking torque when the engine is ready to be stopped, the fuel is cut and the electric machine 14 is used to motor the engine 12 with sufficient torque to result in net zero crankshaft output torque. Alternatively, if the engine 12 needs to be refueled during the electric torque modulation, the engine 12 is fueled until the vehicle comes to a stop, similar to the abrupt and slow deceleration modes, described in further detail below.

When decelerating in the abrupt deceleration mode, the TCC is released at $V_2$ (approximately 15 mph) (t=$t_C$), in the case where the transmission includes a TCC, and the engine 12 remains spinning until after the vehicle has come to a complete stop (t=$t_D$). In order for the engine 12 to be stopped, certain stop criteria must be met including, but not limited to, the engine RPM being less than an RPM threshold, the manifold absolute pressure (MAP) being less than a MAP threshold and the transmission being in a desired gear state. When decelerating in the slow deceleration mode, the TCC is released at $V_{SLOW}$ (approximately 10 mph) (t=$t_G$), in the case where the transmission includes a TCC, and the engine 12 is refueled to maintain creep torque. The engine 12 remains spinning until after the vehicle has come to a complete stop (t=$t_F$).

Regardless of which deceleration mode the control system is operating in, if the brake pedal 40 is released (i.e., no pressure applied to the brake pedal), the engine 12 is refueled instead of being stopped. The electric machine 14 is used to match the fueled engine speed. If the air-conditioning (A/C)

is active, the control module 44 estimates the compressor torque contribution and compensates for the extra load in the electric machine torque.

Figure 3:
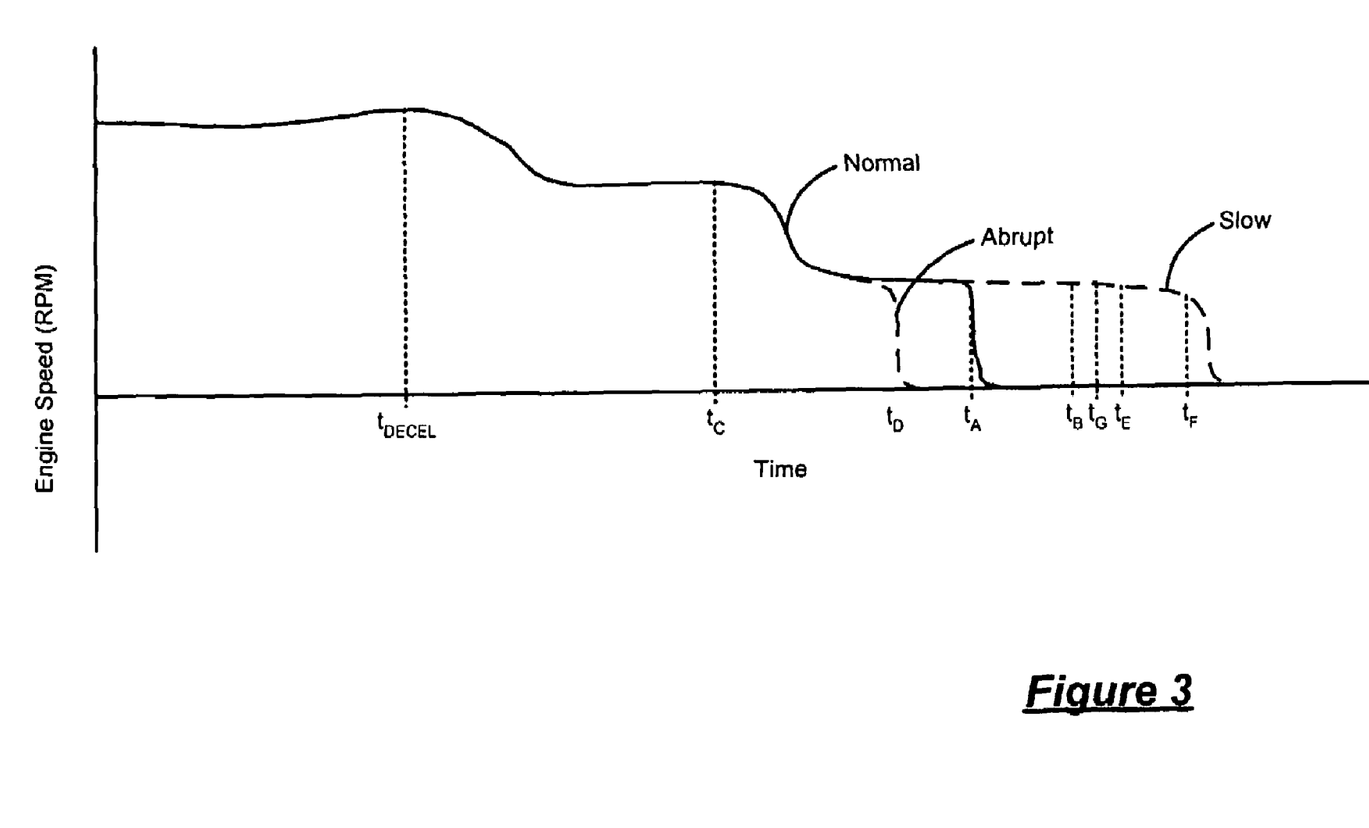
FIG. 3 is a graph illustrating engine speed for the normal, abrupt and slow deceleration modes.

Referring now to FIG. 3, exemplary engine speed curves are graphically illustrated. The exemplary engine speed curves include a normal deceleration curve, an abrupt deceleration curve and a slow deceleration curve. The exemplary engine speed curves indicate the times at which the engine ceases spinning for each of the normal deceleration, the abrupt deceleration and the slow deceleration modes.

Figure 4:
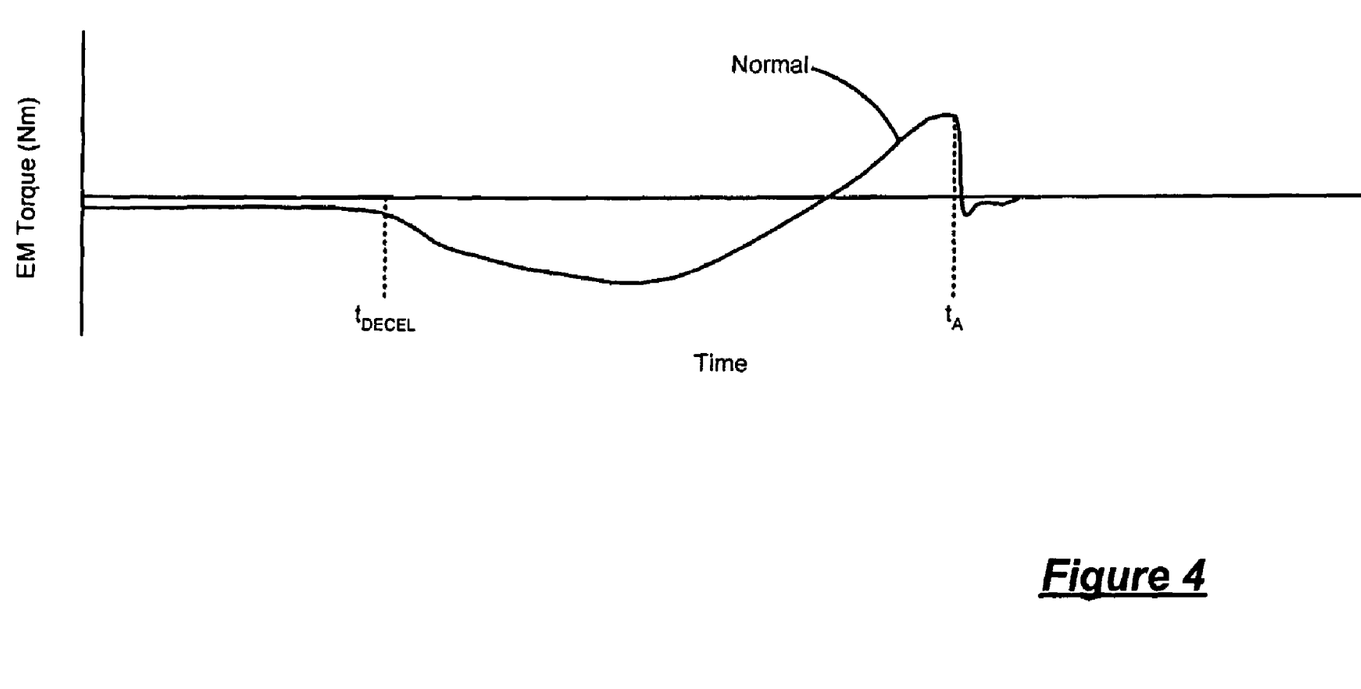
FIG. 4 is a graph illustrating electric machine torque for the normal deceleration mode.

Referring now to FIG. 4, an exemplary electric machine torque curve is illustrated for the normal deceleration mode. The electric machine torque includes a gentle torque reversal during normal deceleration. At $t_A$, the electric machine torque drops to zero to provide zero crank torque before stall. In this manner, the engine 12 does not spin while the vehicle continues to decelerate until stopping at $t_B$.

Figure 5:
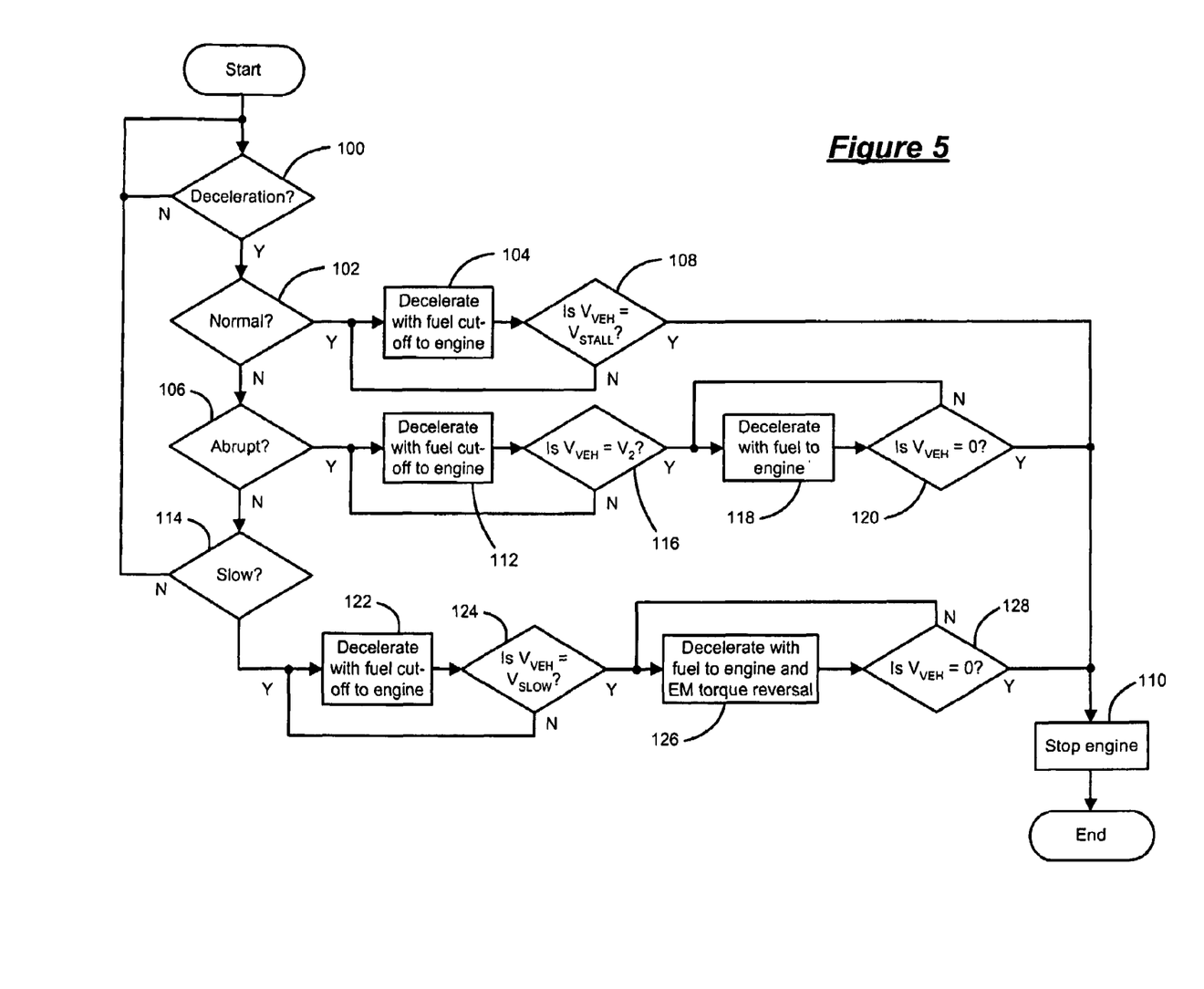
FIG. 5 is a flowchart illustrating steps performed by the engine spin control system according to the present invention.

Referring now to FIG. 5, the general steps executed by the engine spin control system of the present invention will be discussed in detail. In step 100, control determines whether the vehicle is decelerating. If the vehicle is decelerating, control loops back. If the vehicle is not decelerating, control continues in step 102. In step 102, control determines whether the vehicle deceleration is normal. If the deceleration is normal, control continues in step 104. If the deceleration is not normal, control continues in step 106. In step 104, control operates in the normal deceleration mode and cuts-off fuel to the engine 12 during deceleration. In step 108, control determines whether $V_{VEH}$ is equal to $V_{STALL}$. If $V_{VEH}$ is not equal to $V_{STALL}$, control loops back to step 104. If $V_{VEH}$ is equal to $V_{STALL}$, control stops the engine in step 110 and control ends.

In step 106, control determines whether the deceleration is abrupt. If the deceleration is abrupt, control continues in step 112. If the deceleration is not abrupt, control continues in step 114. In step 112, control operates in the abrupt deceleration mode and cuts-off fuel to the engine 12 during deceleration. In step 116, control determines whether $V_{VEH}$ is equal to $V_2$. If $V_{VEH}$ is not equal to $V_2$, control loops back to step 112. If $V_{VEH}$ is equal to $V_2$, control refuels the engine 12 during deceleration in step 118. In step 120, control determines whether $V_{VEH}$ is equal to 0. If $V_{VEH}$ is not equal to 0, control loops back to step 118. If $V_{VEH}$ is equal to 0, control stops the engine in step 110 and control ends.

In step 114, control determines whether the deceleration is slow. If the deceleration is not slow, control loops back to step 100. If the deceleration is slow, control continues in step 122. In step 122, control operates in the slow deceleration mode and cuts-off fuel to the engine 12 during deceleration. In step 124, control determines whether $V_{VEH}$ is equal to $V_{SLOW}$. If $V_{VEH}$ is not equal to $V_{SLOW}$, control loops back to step 122. If $V_{VEH}$ is equal to $V_{SLOW}$, control refuels the engine 12 during deceleration and enable electric machine torque reversal in step 126. In step 128, control determines whether $V_{VEH}$ is equal to 0. If $V_{VEH}$ is not equal to 0, control loops back to step 126. If $V_{VEH}$ is equal to 0, control stops the engine in step 110 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A hybrid vehicle, comprising:
   an engine;
   an electric machine that selectively drives said engine; and
   a control module that monitors a deceleration rate of said vehicle, that regulates fueling of said engine based on said deceleration rate and that regulates rotation of a crankshaft of said engine based on said deceleration rate,
   wherein said control module drives said engine by applying a positive torque to said engine via said electric machine to increase engine torque after startup of said engine and based on said deceleration rate, and
   wherein said control module drives said engine by applying a positive torque to said engine via said electric machine when said engine is not receiving fuel.

2. The hybrid vehicle of claim 1 wherein said control module cuts-off fuel to said engine upon deceleration of said hybrid vehicle and inhibits rotation of said engine when a vehicle speed is equal to a stall speed.

3. The hybrid vehicle of claim 2 wherein said electric motor drives said engine during said deceleration to inhibit rotation of said crankshaft.

4. The hybrid vehicle of claim 1 wherein said control module cuts-off fuel to said engine upon deceleration of said hybrid vehicle and fuels said engine when a vehicle speed decelerates to a threshold vehicle speed.

5. The hybrid vehicle of claim 4 wherein said control module cuts-off fuel to said engine and inhibits rotation of said engine when engine stop conditions are achieved.

6. The hybrid vehicle of claim 5 wherein said engine stop conditions include said vehicle speed being equal to zero, a rotational speed of said crankshaft being less than a threshold speed and a manifold absolute pressure (MAP) of said engine being less than a threshold pressure.

7. The hybrid vehicle of claim 1 wherein said control module cuts-off fuel to said engine upon deceleration of said hybrid vehicle and fuels said engine when a vehicle speed decelerates to a stall speed.

8. A method of regulating a hybrid electric vehicle during deceleration, comprising:
   monitoring a deceleration rate of said vehicle;
   regulating fueling of an engine based on said deceleration rate;
   regulating rotation of a crankshaft of said engine based on said deceleration rate,
   driving said engine by applying a positive torque on said engine via an electric machine to increase engine torque after startup of said engine and based on said deceleration rate; and
   driving said engine by applying a positive torque to said engine via said electric machine when said engine is not receiving fuel.

9. The method of claim 8 further comprising cutting-off fuel to said engine upon deceleration of said hybrid vehicle and inhibiting rotation of said engine when a vehicle speed is equal to a stall speed.

10. The method of claim 9 further comprising driving said engine during said deceleration using an electric machine to inhibit rotation of said crankshaft.

11. The method of claim 8 further comprising cutting-off fuel to said engine upon deceleration of said hybrid vehicle and fueling said engine when a vehicle speed decelerates to a threshold vehicle speed.

12. The method of claim 11 further comprising cutting-off fuel to said engine and inhibiting rotation of said engine when engine stop conditions are achieved.

13. The method of claim 12 wherein said engine stop conditions include said vehicle speed being equal to zero, a rotational speed of said crankshaft being less than a threshold speed and a manifold absolute pressure (MAP) of said engine being less than a threshold pressure.

14. The method of claim 8 further comprising fueling said engine when a vehicle speed decelerates to a stall speed.

15. A hybrid vehicle, comprising:
an engine;
a clutch that selectively enables said engine to directly drive a transmission;
an electric machine that selectively drives said engine; and
a control module that monitors a deceleration rate of said vehicle, that regulates fueling of said engine based on said deceleration rate, that regulates engagement of said clutch based on said deceleration rate and that regulates rotation of a crankshaft of said engine based on said deceleration rate,
wherein said control module drives said engine by applying a positive torque on said engine via said electric machine to increase engine torque after startup of said engine and based on said deceleration rate,
wherein said positive torque is applied to said engine to decrease said deceleration rate.

16. The hybrid vehicle of claim 15 wherein said control module cuts-off fuel to said engine upon deceleration of said hybrid vehicle and inhibits rotation of said engine when a vehicle speed is equal to a stall speed.

17. The hybrid vehicle of claim 16 wherein said electric machine drives said engine during said deceleration to inhibit rotation of said crankshaft.

18. The hybrid vehicle of claim 15 wherein said control module cuts-off fuel to said engine upon deceleration of said hybrid vehicle and fuels said engine when a vehicle speed decelerates to a threshold vehicle speed.

19. The hybrid vehicle of claim 18 wherein said control module disengages said clutch when said vehicle speed achieves said threshold vehicle speed.

20. The hybrid vehicle of claim 18 wherein said control module cuts-off fuel to said engine and inhibits rotation of said engine when engine stop conditions are achieved.

21. The hybrid vehicle of claim 20 wherein said engine stop conditions include said vehicle speed being equal to zero, a rotational speed of said crankshaft being less than a threshold speed and a manifold absolute pressure (MAP) of said engine being less than a threshold pressure.

22. The hybrid vehicle of claim 15 wherein said control module cuts-off fuel to said engine upon deceleration of said hybrid vehicle and fuels said engine when a vehicle speed decelerates to a stall speed.

23. The hybrid vehicle of claim 22 wherein said control module disengages said clutch when said vehicle speed achieves said stall speed.

24. A method of regulating deceleration of a hybrid vehicle, comprising:
monitoring a deceleration rate of said vehicle;
fueling of an engine based on said deceleration rate;
regulating engagement of a clutch that selectively enables an engine to directly drive a transmission based on said deceleration rate;
regulating rotation of a crankshaft of said engine based on said deceleration rate; and
driving said engine by applying a positive torque on said engine via an electric machine to increase engine torque after startup of said engine and based on said deceleration rate,
wherein said positive torque is applied to said engine to decrease said deceleration rate.

25. The method of claim 24 further comprising cutting-off fuel to said engine upon deceleration of said hybrid vehicle and inhibiting rotation of said engine using an electric machine when a vehicle speed is equal to a stall speed.

26. The method of claim 25 wherein said electric machine drives said engine during said deceleration to inhibit rotation of said crankshaft.

27. The method of claim 24 further comprising cutting-off fuel to said engine upon deceleration of said hybrid vehicle and fueling said engine when a vehicle speed decelerates to a threshold vehicle speed.

28. The method of claim 27 further comprising disengaging said clutch when said vehicle speed achieves said threshold vehicle speed.

29. The method of claim 27 further comprising cutting-off fuel to said engine and inhibiting rotation of said engine when engine stop conditions are achieved.

30. The method of claim 29 wherein said engine stop conditions include said vehicle speed being equal to zero, a rotational speed of said crankshaft being less than a threshold speed and a manifold absolute pressure (MAP) of said engine being less than a threshold pressure.

31. The method of claim 24 further comprising cutting-off fuel to said engine upon deceleration of said hybrid vehicle and fueling said engine when a vehicle speed decelerates to a stall speed.

32. The method of claim 31 further comprising disengaging said clutch when said vehicle speed achieves said stall speed.

33. The hybrid vehicle of claim 1 wherein said control module transitions from back driving said engine by applying a negative torque on said engine to driving said engine by applying a positive torque on said engine.

34. The hybrid vehicle of claim 1 wherein said control module stops driving said engine when said engine is stopped.

35. The hybrid vehicle of claim 1 wherein said control module drives said engine by applying a positive torque on said engine via said electric machine from startup of said engine to when said engine is stopped.

36. The hybrid vehicle of claim 1 wherein said control module drives said engine by applying a positive torque on said engine via said electric machine from when said engine is stopped to when said engine is operating at an idle speed.

37. The hybrid vehicle of claim 1 wherein said control module drives said engine by applying a positive torque on said engine via said electric machine prior to engine startup.

38. The hybrid vehicle of claim 15 wherein said control module drives said engine by applying a positive torque on said engine via said electric machine when said engine is not receiving fuel.

39. The hybrid vehicle of claim 1 wherein said control module drives said engine by applying a positive torque on said engine via said electric machine based on air-conditioning compressor load.

40. The hybrid vehicle of claim 1 wherein said control module drives said engine by applying a positive torque on said engine via said electric machine to provide a net engine output torque that is at least one of neutral and positive.

41. The hybrid vehicle of claim 15 further comprising:
a clutch that selectively enables said engine to directly drive a transmission,
wherein said control module regulates engagement of said clutch based on said deceleration rate.

42. The hybrid vehicle of claim 1 wherein said deceleration rate is based on at least one of back-driving of said engine and engine-braking.

43. The hybrid vehicle of claim 1 wherein said positive torque is applied to said engine to decrease said deceleration rate.

44. The hybrid vehicle of claim 1 wherein said positive torque is applied to said engine to adjust said deceleration rate during a transition from a drag state of said engine to a coasting state of said engine.

45. The hybrid vehicle of claim 1 wherein said positive torque is applied to said engine to adjust said deceleration rate during a transition from a drag state of said engine to an idle state of said engine.

* * * * *